(12) United States Patent
Walukiewicz et al.

(10) Patent No.: US 8,915,679 B2
(45) Date of Patent: Dec. 23, 2014

(54) PNEUMATIC TRANSPORT WITH MULTI VESSEL DISCHARGE

(71) Applicants: Henry Walukiewicz, Dunellen, NJ (US); Arun Mehta, Bensalem, PA (US); Tony F. Habib, Lancaster, OH (US)

(72) Inventors: Henry Walukiewicz, Dunellen, NJ (US); Arun Mehta, Bensalem, PA (US); Tony F. Habib, Lancaster, OH (US)

(73) Assignee: Diamond Power International, Inc., Lancaster, OH (US)

( * ) Notice: Subject to any disclaimer, the term of this patent is extended or adjusted under 35 U.S.C. 154(b) by 0 days.

(21) Appl. No.: 13/741,798

(22) Filed: Jan. 15, 2013

(65) Prior Publication Data

US 2014/0199126 A1 Jul. 17, 2014

(51) Int. Cl.
*B65G 53/66* (2006.01)
*B65G 53/06* (2006.01)

(52) U.S. Cl.
CPC ............... *B65G 53/66* (2013.01); *B65G 53/06* (2013.01)
USPC ............................................ 406/30; 406/120

(58) Field of Classification Search
CPC ....................................................... B65G 53/66
USPC ....................................................... 406/29, 30
See application file for complete search history.

(56) References Cited

U.S. PATENT DOCUMENTS

| | | | |
|---|---|---|---|
| 2,965,417 A | 12/1960 | Tolman | |
| 3,178,234 A * | 4/1965 | Schulte et al. | 266/47 |
| 4,059,310 A * | 11/1977 | Waskiewicz et al. | 406/30 |
| 4,582,454 A * | 4/1986 | Brandenburg et al. | 406/32 |
| 5,009,551 A * | 4/1991 | Swartz | 406/128 |
| 5,407,305 A | 4/1995 | Wallace | |
| 5,775,237 A | 7/1998 | Reilly et al. | |
| 6,964,543 B2 * | 11/2005 | Gerber | 406/14 |
| 7,101,120 B2 * | 9/2006 | Jurkovich | 406/12 |
| 7,114,889 B2 * | 10/2006 | Kanou et al. | 406/14 |
| 7,295,932 B2 * | 11/2007 | Neundorfer et al. | 702/45 |
| 2011/0299943 A1 * | 12/2011 | Woolever | 406/14 |
| 2012/0243950 A1 | 9/2012 | Ruggero et al. | |

OTHER PUBLICATIONS

United Conveyor Corporation—PAX™ Pneumatic Ash Extractor—Dry Bottom Ash Vacuum Systems.

* cited by examiner

*Primary Examiner* — William R Harp
(74) *Attorney, Agent, or Firm* — Brinks Gilson & Lione

(57) ABSTRACT

An ash transport system and method is provided that includes a transport line, four hoppers, and an airlock or hopper valve attached to each hopper. The ash transport system transports an ash mass from the airlock or hopper valve to the transport line if pressure in the transport line falls below a predefined pressure threshold assigned to the respective airlock or hopper valve. After a predefined period of time elapses, the ash transport system transports the ash mass from the airlock or hopper valve to the transport line if the pressure in the transport line falls below different respective predefined pressure thresholds. The airlocks and hopper valves simultaneously transport the ash masses to the transport line if, prior to the predefined period of time elapsing, the pressure in the transport line falls below each of the respective predefined pressure thresholds.

37 Claims, 11 Drawing Sheets

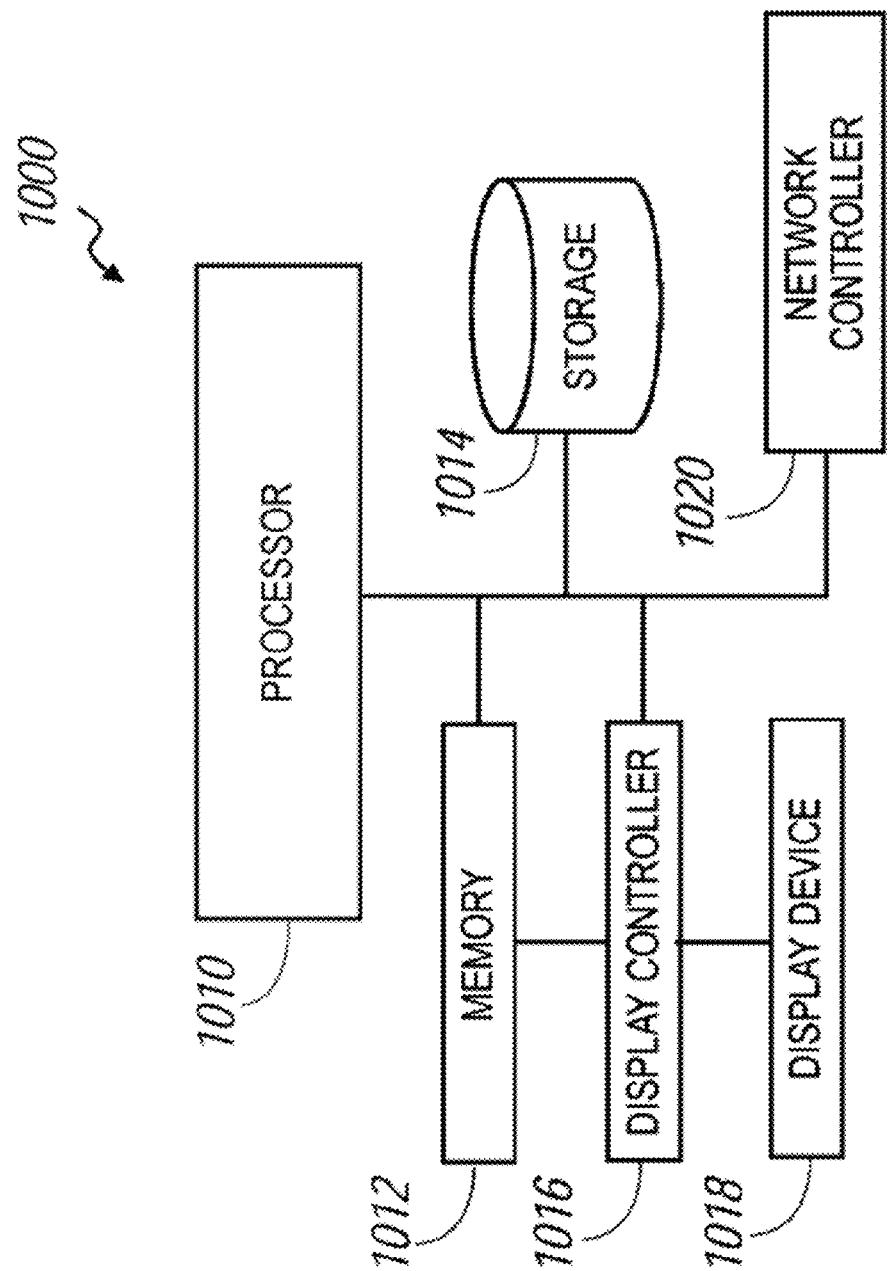

PNEUMATIC TRANSPORT WITH MULTI VESSEL DISCHARGE

FIELD OF THE INVENTION

The present invention generally relates to ash transport systems for removing ash from large scale coal burning combustion systems. More specifically, the present invention relates to multi vessel discharge in such ash transport systems.

BACKGROUND OF THE INVENTION

Combustion of coal in power utility fired boilers produces two types of waste products: fly ash, which includes ash particles that are small enough to be entrained in flue gas, and bottom ash, which includes larger ash particles that overcome drag, and drop to the bottom of the boiler. A number of systems have been developed to transport the fly ash to a storage silo.

However, existing fly ash transport systems function at low capacity, consume large amounts of energy, have high ash consolidation times in the hoppers (causing the ash to clump), convey the ash at high velocity (causing transport pipe erosion), and require larger transport pipes.

An electrostatic precipitator or a bag house system typically collects the fly ash, after which storage hoppers underneath the precipitator or bag house system collect the fly ash. The fly ash is then transported from the storage hoppers via the transport piping to a storage silo. The hoppers are typically pyramid shaped vessels designed to maximize space and volume. Unfortunately, pyramid hoppers are inefficient and erratic in discharging fly ash in comparison to conical hoppers because of friction between adjacent walls.

Fly ash is discharged from the hoppers and transported pneumatically, either via a vacuum or pressure system, to a silo which is several hundred feet away. In either case, the fly ash can be transported by way of dilute phase transport or dense phase transport. In dilute phase transport, the pickup velocity, which is the air velocity based on total pipe area, is typically above 3,500 feet per minute. Thus the solids are mostly suspended during conveyance. By comparison, in dense phase transport, the pickup velocity is nominally below 2,000 feet per minute, which yields high solid transport rate but with the solid being only partially suspended. This type of transport is used for higher conveyance rate and lower pipe erosion.

In a vacuum system, a vacuum pump sucks transport air and fly ash from the hoppers and then through transport piping. The air/ash mixture discharges into a collection tank having bag filters to clean air prior to discharge into the atmosphere via the vacuum producer. System operating pressure is near 18 inHg vacuum and is typically measured upstream of the vacuum producer.

In pressure type pneumatic conveying systems, pressurized air transports fly ash. Vessels (i.e. airlocks) underneath hoppers feed solids into a pressurized transport line. The hoppers are typically at or slightly below atmospheric pressure. Each airlock has a volume tank, and an inlet valve, an outlet valve, and an equalizer valve each attached to the volume tank. An equalizer valve is three-way valve used to equalize the pressure between the airlock and the hopper during fill or between the airlock and the transport line during discharge.

To allow the solids to be transferred by gravity from the storage hopper through the airlock and to the pressurized transport line, an airlock's three valves are opened and closed in a programmed sequence. Since the airlock tank's volume usually is considerably less than the hopper's volume, the airlock feeds the transport line in multiple batches before the hopper is empty.

In some pressure transport systems, the airlock sequence logic opens only one airlock at a time into the transport line. As the airlock outlet valve opens and the solids are fed into the transport line, the pressure rises as the transport line reacts to resistance created by the solids. The greater the quantity of solids being conveyed, the higher the system pressure will become. Dumping one airlock at a time can be characterized by a pressure rise when the airlock outlet valve first opens, followed by a steady falloff in pressure as the airlock empties. This is inefficient because when the pressure falls, the transport velocity rises causing higher erosion of the pipe wall, and the system is not moving solids to its maximum extent. For example, the system often operates at or near design pressure only 25-50% of the time. This is largely due to the inability of the hopper, especially the pyramid type but also the conical type, to discharge enough material to keep the airlock full. Also, certain fly ash material discharges poorly from both the airlock and the hopper. Slow discharge starves the transport line in a single airlock dump system.

Dense phase type transport systems with simultaneous multi vessel discharge empty all airlocks in a row at once. However, in these systems the airlocks do not have bottom valves. Instead, the transport vessel has only one valve that separates the transport piping from the hopper. Thus the fly ash is dropped directly into the transport piping using multiple transport vessels, after which pressurized air is introduced at multiple locations to convey the material in slugs.

SUMMARY OF THE INVENTION

In overcoming the drawbacks and other limitations of the related art, the present invention provides an improved ash transport system and an improved method of transporting ash.

In some embodiments of the present invention, an ash transport system is provided, which includes a transport line, a pressure sensor for measuring pressure in the transport line, first and second airlocks, and first and second hoppers respectively attached to the first and second airlocks. The ash transport system is configured to transport, prior to a predefined period of time elapsing, an ash mass from the first airlock to the transport line if the pressure falls below a first pressure threshold. The ash transport system is further configured to transport, prior to the predefined period of time elapsing, the ash mass from the second airlock to the transport line if the pressure falls below a second pressure threshold that is different from the first pressure threshold. The ash transport system is further configured to transport, after the predefined period of time elapses, the ash mass from the first airlock to the transport line if the pressure falls below a third pressure threshold that is different than the first pressure threshold. The ash transport system is further configured to transport, after the predefined period of time elapses, the ash mass from the second airlock to the transport line if the pressure falls below a fourth pressure threshold that is different from the second pressure threshold.

In some embodiments of the present invention, a method of transporting ash is provided. The method includes measuring pressure in a transport line. The method further includes transporting an ash mass from a first airlock to the transport line if the pressure in the transport line crosses a first pressure threshold. The method further includes transporting the ash mass from a second airlock to the transport line if the pressure in the transport line crosses a second pressure threshold. The method further includes transporting, after a predefined period of time elapses, the ash mass from the second airlock to the transport line if the pressure in the transport line crosses a third pressure threshold that is different from the second pressure threshold.

In some embodiments of the present invention, an ash transport system is provided, which includes a first hopper valve, a second hopper valve, a transport line, a vacuum pump attached to the transport line and configured to cause the first and second ash masses to be transported through the transport line, and a pressure sensor for measuring pressure in the transport line. The ash transport system is configured to transport, prior to a predefined period of time elapsing, an ash mass from the first hopper valve to the transport line if the pressure falls below a first pressure threshold. The ash transport system is further configured to transport, prior to the predefined period of time elapsing, the ash mass from the second hopper valve to the transport line if the pressure falls below a second pressure threshold. The ash transport system is further configured to transport, after the predefined period of time elapses, the ash mass from the second hopper valve to the transport line if the pressure falls below a third pressure threshold that is different from the second pressure threshold.

Further features and advantages of the present disclosure will become apparent from consideration of the following description and the appended claims when taken in connection with the accompanying drawings. It should be understood that the description and specific examples are intended for purposes of illustration only and are not intended to limit the scope of the present disclosure.

BRIEF DESCRIPTION OF THE DRAWINGS

FIG. 11 is a schematic view of a processing system for implementing the systems and methods described herein.

The drawings described herein are for illustration purposes only and are not intended to limit the scope of the present invention.

DETAILED DESCRIPTION

The following description is merely exemplary in nature and is not intended to limit the present disclosure, application, or uses. The terms "about" or "substantially" used herein with reference to a shape or quantity includes variations in the recited shape or quantity that are equivalent to the shape or quantity for an intended purpose or function.

Figure 1:
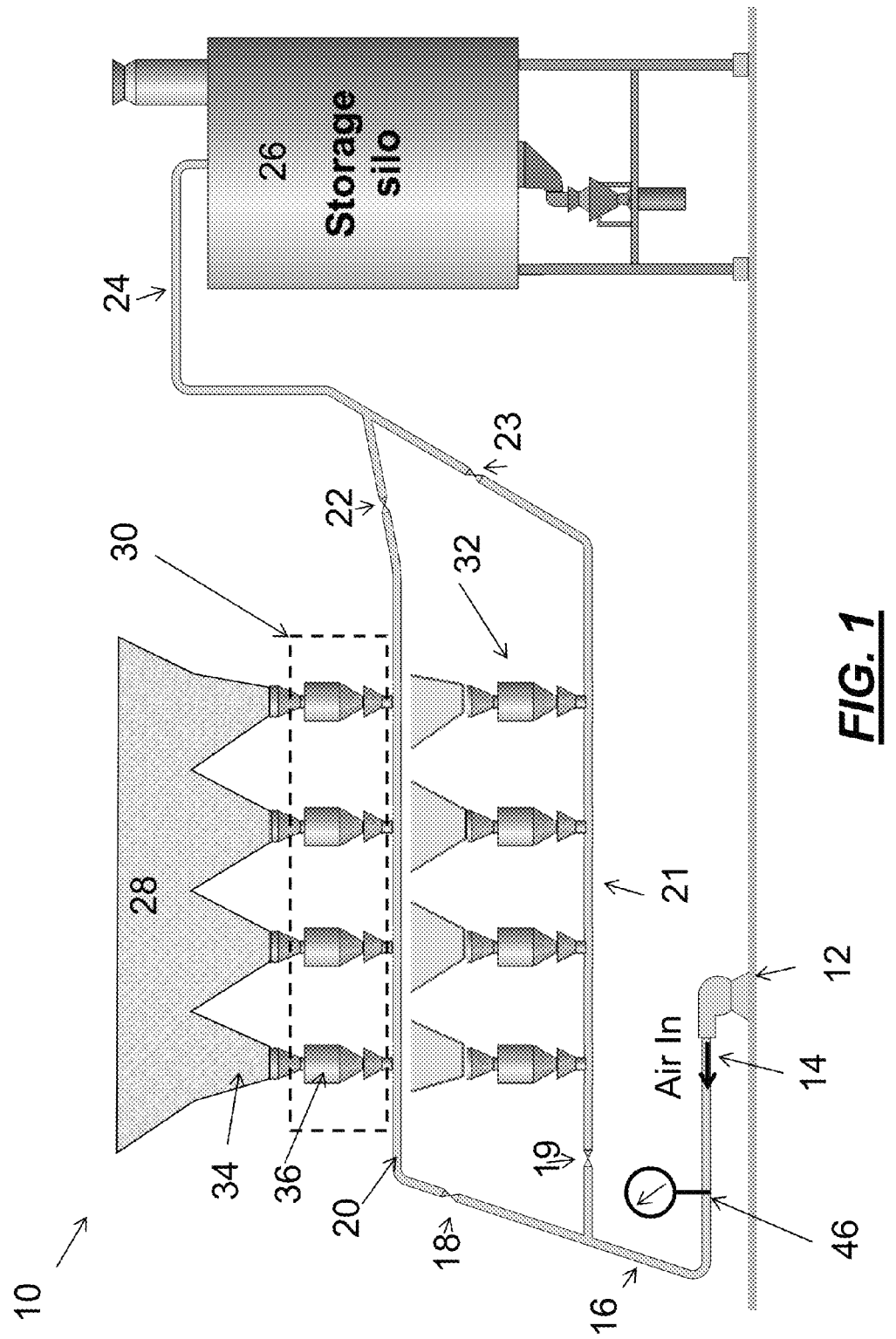
FIG. 1 is a schematic view of an ash pressure transport system using a blower as an air producer.

FIG. 1 illustrates an ash transport system 10 implemented as a pressure blower system. A pressure blower 12 provides air 14 through a first transport pipe 16 (e.g. transport line). The first transport pipe 16 branches into two valves 18 and 19 which are connected to second and third transport pipes 20 and 21 (e.g. transport lines) which are respectively connected to two valves 22 and 23. The valves 22 and 23 lead to a fourth transport pipe 24 (e.g. transport line) which is connected to a storage silo 26.

A collector 28, for example an electrostatic precipitator or a bag house system, collects ash (e.g. fly ash, ash mass, ash quantity, ash volume, ash particle, ash stream) produced in the coal combustion process. The collector 28 then drops the ash via gravity into a first (e.g. front) row 30 and second (e.g. back) row 32 of hoppers 34 underneath the collector 28. In the case of a precipitator, normally the front row 30 receives the majority of the ash, thus more time is required in draining the front row 30. By contrast, a bag house drops the ash evenly. Each row 30 and 32 is shown having four hoppers 34, but it is understood that the each row 30 and 32 may have two, three, five, six, seven, eight, or more hoppers 34, for example. The hoppers 34 may have pyramid or conical shapes, or any other shapes. Underneath each of the hoppers 34 are respective airlocks 36. A process feedback signal (e.g. pressure feedback signal) is provided based on a measurement taken by a sensor 46 (e.g. pressure sensor) upstream of the hoppers 34 and near the pressure blower 12.

Figure 2:
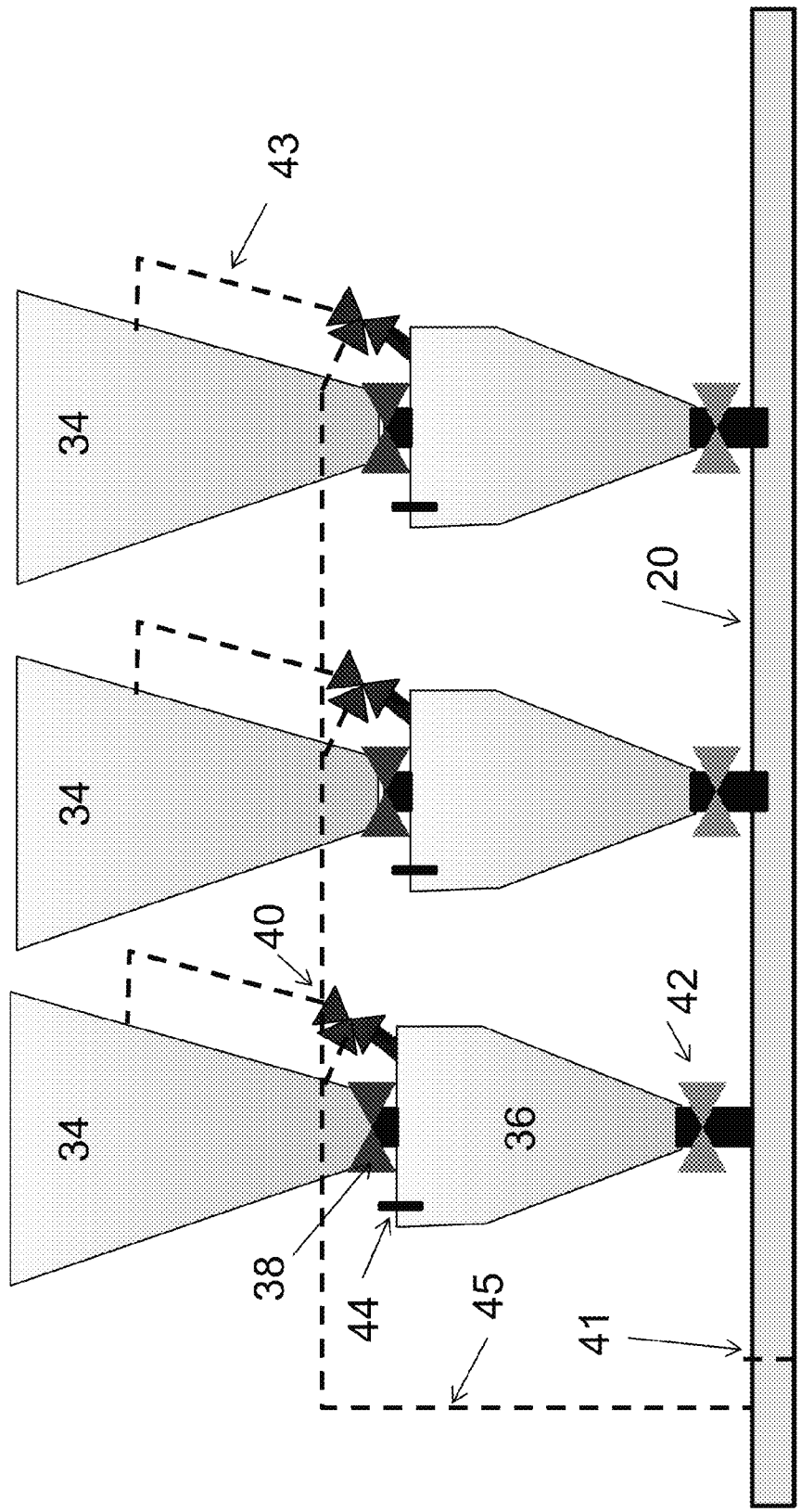
FIG. 2 is a schematic view of an airlock of the ash transport system.

FIG. 2 illustrates an airlock 36 in more detail. Each airlock 36 has an inlet valve 38 and equalizer valve 40, each of which connect a respective hopper 34 to the airlock 36. Each airlock 36 of the first row 30 of hoppers 34 has an outlet valve 42 that connects the second transport pipe 20 to the airlock 36. The airlock 36 also has a level probe 44 which checks whether the airlock tank is completely filled or filled to a predefined threshold.

A separate airlock line 45 branches from transport pipe 16 and supplies air at a pressure slightly greater than transport line 20 to provide a positive pressure to drive the flow of ash from airlocks 36 into transport line 20. The airlock line 45 is shown passing through equalizer valves 40. A positive pressure can be provided to the use of a restrictor such as an orifice plate 41 or other pressure reduction element in transport pipe 16. By tapping into transport pipe 16 before the restrictor (e.g. to the left of the orifice plate 41 in FIG. 2) a higher pressure source is applied to the upper portion of each airlock 36 for facilitating draining as mentioned previously. Thus, the pressure applied to the airlock is higher than pressure in transport line 20 after the orifice plate 41 (e.g. to the right of the orifice plate 41 in FIG. 2).

Turning to FIGS. 1 and 2, to allow the ash (e.g. solids) to be transferred by gravity from a given hopper 34 through an airlock 36 and to transport pipes 20 and 24, the inlet valve 38, equalizer valve 40, and outlet valve 42 are opened and closed in a programmed sequence. Since the volume of the tank of the airlock 36 is less than the volume of the hopper 34, the airlock feeds the transport line in multiple batches before the hopper 34 is empty. Normally, as the airlock 36 is filled, the air displaced by the material entering the airlock 36 returns to the hopper 34 via the equalizer valve 40. Thus, the equalizer valve 40 ensures that the pressure in the airlock 36 is synchronized with the pressure in the hopper 34, as shown by dotted line 43.

Figure 3:
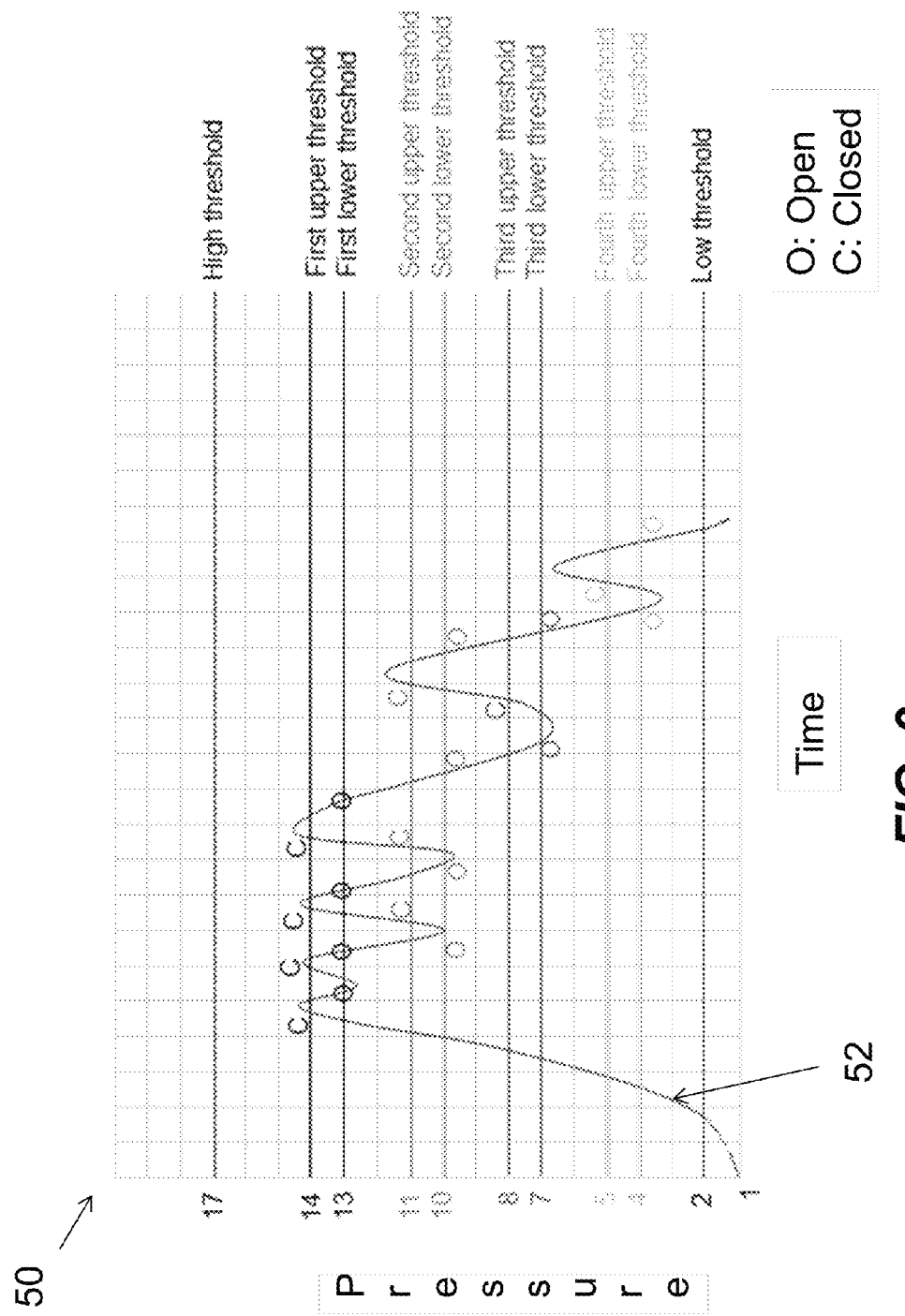
FIG. 3 is a chart showing pressure in the transport line as a function of time, and showing a multi-dump airlock sequencing logic.

FIG. 3 illustrates a chart 50 showing pressure 52 in the transport line as a function of time, and showing a multi-dump airlock sequencing logic. The logic may be implemented by a controller, control circuit, module, server, engine, or other device (as described in FIG. 11, for example) that is in communication with the sensor 46, hoppers 34, airlocks 36, transport lines 16, 20, 21, 24 and other elements of the system of FIGS. 1 and 2, such that the steps described below with respect to FIG. 3 may occur automatically without user intervention. Each of the elements of the system of FIGS. 1 and 2 may be configured to perform the steps automatically as discussed below. However, in some implementations, one or more of the steps may be implemented by a user.

Pressure is shown as psi gage pressure (above atmospheric). The system maintains system operating pressure in an optimal range at all times without significant falloffs or surges by controlling the airlocks 36 feeding through the use of pressure monitoring, timers and selective sequencing. The system constantly reacts to the pressure in the transport line by stopping and starting discharge from airlocks 36 as necessary. As individual airlocks 36 become empty, they are replaced in the sequence by full airlocks 36, and put back in a queue. Timers are used to set the amount of time an airlock takes to fill and empty. When used, the high level probe 44 allows for a more precise filling of fly ash to a determined level.

Four upper and four lower pressure thresholds are given for a four hopper system. Each of these may or may not be predefined. First, second, third, and fourth upper pressure thresholds are shown respectively at about 14 psi, about 11 psi, about 8 psi, and about 5 psi. First, second, third, and fourth lower pressure thresholds are shown respectively at about 13 psi, about 10 psi, about 7 psi, and about 4 psi. If more than four airlocks 36 are in the same row, then each additional airlock will also have its own upper and lower thresholds. Pressure is measured by the pressure sensor 46, as discussed earlier.

Initially, a first hopper 34 (and first airlock 36) closest to the storage silo 26 is assigned a first pressure band defined by the first upper and lower pressure thresholds (between about 14 psi and about 13 psi). A second hopper 34 (and second airlock 36) adjacent to the first hopper 36 is assigned a second pressure band defined by the second upper and lower pressure thresholds (between about 11 psi and about 10 psi). A third hopper 34 (and third airlock 36) adjacent to the second hopper 36 is assigned a third pressure band defined by the third upper and lower pressure thresholds (between about 8 psi and about 7 psi). A fourth hopper 34 (and fourth airlock 36) adjacent to the third hopper 36 is assigned a fourth pressure band defined by the fourth upper and lower pressure thresholds (between about 5 psi and about 4 psi). Airlocks 1, 2, 3, and 4 shown in Tables 1 and 2 below respectively refer to the first, second, third, and fourth airlocks 36. Each of these orderings are based on how close each airlock 36 is to the silo 26.

It is understood that although specific pressures are provided for the thresholds and bands, each of these pressure values may take on other predefined values. Moreover, in some examples (e.g. if the pressure is low enough), two or more pressure bands may have identical threshold values. For example, the (1) first and second, (2) second and third, (3) third and fourth, (4) first and third, (5) first and fourth, (6) second and fourth, (7) first, second, and third, (8) first, second, and fourth, (9) first, third, and fourth, (10) second, third, and fourth, or (11) all the pressure bands may have identical pressure values, for example.

The assignments begin as shown in Count 1 of Table 1 below. Moreover, the airlocks 36 (and thus the hoppers 34) periodically switch assigned pressure bands, as will be discussed in more detail below with reference to Table 1 below. The assignments rotate based on an airlock count. The airlock count may be equal to the total time it takes to fill and empty an airlock. The airlock count can be a predefined value (e.g. about 5 seconds, or between about 5 seconds to about 30 seconds, or between about 15 seconds and about 30 seconds, for example) based on measurements prior to operation.

TABLE 1

|        | Count 1   | Count 2   | Count 3   | Count 4   | Count 5   | ... | ... | Count 20  |
|--------|-----------|-----------|-----------|-----------|-----------|-----|-----|-----------|
| Band 1 | Airlock 1 | Airlock 2 | Airlock 3 | Airlock 4 | Airlock 1 | ... | ... | Airlock 4 |
| Band 2 | Airlock 2 | Airlock 3 | Airlock 4 | Airlock 1 | Airlock 2 | ... | ... | Airlock 1 |
| Band 3 | Airlock 3 | Airlock 4 | Airlock 1 | Airlock 2 | Airlock 3 | ... | ... | Airlock 2 |
| Band 4 | Airlock 4 | Airlock 1 | Airlock 2 | Airlock 3 | Airlock 4 | ... | ... | Airlock 3 |

For example, each airlock 36 may have a predefined airlock count determined by a timer. The timer is initially set at a predefined time value X that counts down. The timer determines the fill time by counting down X while the inlet valve 38 is open. The timer stops either when the timer clocks down to zero or when the ash level reaches the level probe 44, indicating that the airlock tank is completely filled or filled to a predefined level. Thus, the fill time is either X or, in the case where the level probe 44 detects that the airlock tank is filled, somewhat less than X. The timer then determines the empty time (e.g. the time it takes for the outlet valve 42 to release the ash and empty the airlock) by counting down from Y to 0 seconds, unless the timer is paused due to system pressure exceeding an upper threshold value currently assigned to the airlock 36. If the system pressure is low compared to assigned pressure band, empty time is equal to Y. If not, the empty time is equal to Y plus the pause time. Further, the airlock count may also be based on boiler load, or a number of other variables, for example. Generally, the airlock count may be a predefined period of time that is based on an ash holding capacity of the airlock 36 and/or hopper 34. The airlock counts of the airlocks 36 may all be equal or about equal, or they may be different from each other.

Start-up is described as follows. Initially, the valves 18 and 22 are opened and the valves 19 and 23 are closed, so that the first row 30 of hoppers 34 can be discharged. The pressure blower 12 introduces air into the transport pipes 16, 20, and 24. At this point, no ash is introduced, thus pressure is at about 3 psi. The four airlocks 36 in row 30 are completely filled with ash or are filled to a predefined level from their respective hoppers 34, and thus the airlock counts for each airlock 36 begins.

The first airlock 36 is opened, and fly ash flows in the transport pipe 20 from the first hopper 34, causing the pressure to rise. The sensor 46 continually measures the pressure in the transport pipe 16. If the pressure does not rise above the first upper pressure threshold (e.g. 14 psi) after a first predefined period of time (e.g. about 5 seconds) elapses, then the second airlock 36 is also opened and discharges ash into the transport pipe 20. If the pressure does not rise above the second upper pressure threshold (e.g. 11 psi) after another, second predefined period of time (e.g. about 5 seconds) elapses, then the third airlock 36 is also opened and discharges ash into the transport pipe 20. If the pressure does not rise above the third upper pressure threshold (e.g. 8 psi) after another, third predefined period of time (e.g. about 5 seconds) elapses, then the fourth airlock 36 is also opened and discharges ash into the transport pipe 20, third upper pressure threshold (e.g. 5 psi). If at any time an upper pressure threshold is exceeded then the corresponding airlock closes. During this time, the airlock counts continue timing, however the predefined period of time for the bottom gate time stops until the corresponding lower threshold is reached for that particular airlock.

Steady-state operation is described as follows. If the pressure exceeds the first upper threshold, then the first airlock 36 is closed, thus no airlocks 36 will be open. But if the pressure falls below the first lower threshold, indicating that the transport pipe 20 can take more ash, then the first airlock 36 is opened again.

Then, if the pressure falls below the second lower threshold, indicating that the transport pipe 20 can take more ash (e.g. because the open airlocks 36 are emptying), then the second airlock 36 is opened again, thus the first and second airlocks 36 are both simultaneously open. If the pressure exceeds the second upper threshold (e.g. because the too much ash is being dumped in the transport line 20), then the second airlock 36 is closed, thus only the first airlock 36 is open.

Similarly, if the pressure falls below the third lower threshold, indicating that the transport pipe 20 can take more ash (e.g. because the open airlocks 36 are emptying), then the third airlock 36 is opened again, thus the first, second, and third airlocks 36 are simultaneously open. If the pressure exceeds the third upper threshold (e.g. because the too much ash is being dumped in the transport line 20), then the third airlock 36 is closed, thus only the first and second airlocks 36 are open.

Finally, if the pressure falls below the fourth lower threshold, indicating that the transport pipe 20 can take more ash (e.g. because the open airlocks 36 are emptying), then the fourth airlock 36 is opened again, thus the first, second, third, and fourth airlocks 36 are simultaneously open. If the pressure exceeds the fourth upper threshold (e.g. because the too much ash is being dumped in the transport line 20), then the fourth airlock 36 is closed, thus only the first, second, and third airlocks 36 are open.

During the operation described above, the airlocks 36 (and thus hoppers 34) may switch assigned pressure bands. The switching may be automated. Once the airlock count of the first airlock 36 times out (since it has been open the longest), the assignments are switched from Count 1 to Count 2, as shown in Table 1. After the first airlock 36 count has expired, meaning that the airlock 36 is empty, the airlock stops discharging and immediately starts to refill, restarting its airlock count. After it is full, it waits in a queue until it is signaled to begin discharging again. When the airlock count of another airlock 36 times out, likely the second airlock 36 (since it has now been open the longest), the assignments are switched from Count 2 to Count 3, as shown in Table 1. The process continues as an airlock count of each subsequent airlock 36 times out. As shown, the assignments repeat after every fourth assignment for a four hopper system (e.g. the Count 1 assignments are identical to the Count 5 assignments). The assignment shifts typically occur at about 15 to 20 second intervals, which may be predefined e.g. determined during system startup.

In summary, if at any time the pressure rises above its assigned upper threshold, that airlock 36 is stopped from discharging further (and its discharge timer is suspended). The logic is based on a last-in, first-out basis if the pressure rises. Once the pressure falls back below its lower threshold, the airlock 36 that was stopped begins to discharge again.

Further, an alarm may sound if a high pressure threshold (e.g. about 17 psi) is exceeded or if the pressure falls below a low pressure threshold (2 psi).

The system may automatically advance to the second row 32 of airlocks 32 by closing the valves 18 and 22 and opening the valves 19 and 23 after all airlocks 36 in the first row 30 have emptied a predefined number of times (e.g. each of the airlocks 36 has cycled 20 times, which is enough to ensure that all the ash has been discharged). In another example, a pressure sensor 46 may determine that the pressure has been below a low pressure threshold (e.g. 4 psi in FIG. 3) for a predefined period of time, and thus automatically advance to the second row of precipitator 28. In a further example, an operator may observe low pressure in the transport pipe 16, based on an alarm signal, and manually switch to the second row 32. The operator may also switch rows or stop the process based on a high pressure alarm. Moreover, an operator may switch back to a previous row at any time, if necessary.

The second row 32 may similarly go through 20 cycles (or, e.g. about 20 cycles to about 30 cycles) for example if the ash is provided by a bag house, which dumps ash evenly across rows 30 and 32. Alternatively, the second row 32 may need to undergo fewer cycles (e.g. 5 cycles or about 5 cycles) if, for example, a precipitator dumps more ash in the first row 30 than the second row 32. The second row 32 of hoppers 34 can be discharged according to the process described above. Moreover, it is understood that three, four, five, or more rows may be sequentially discharged according to the process described above. If operating in an intermittent mode, the system will stop after all rows have been emptied. If operating in a continuous mode, the system will empty all rows, and then begin again on the first row.

Figure 4:
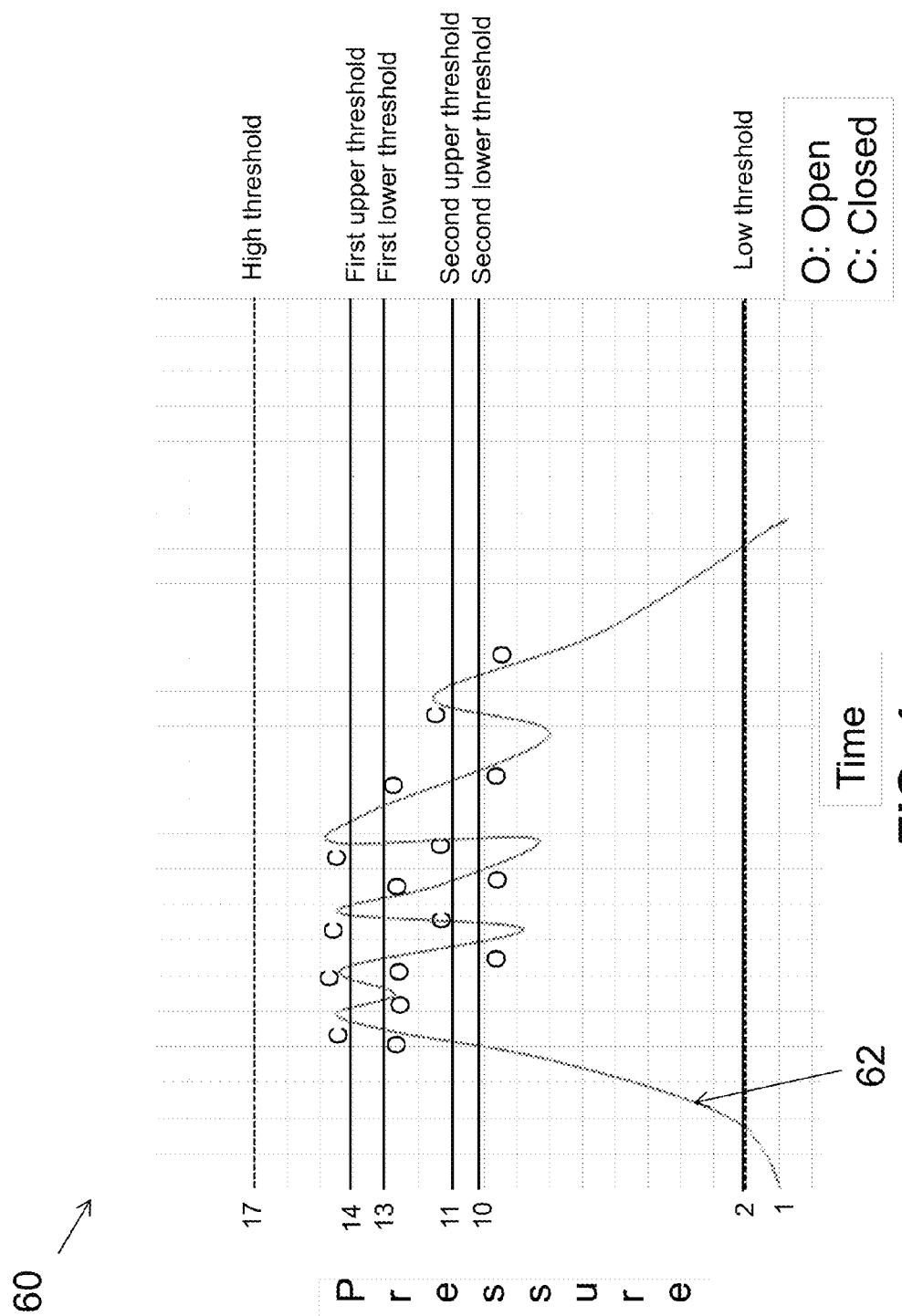
FIG. 4 is a chart showing pressure in the transport line as a function of time, and showing a double-dump airlock sequencing logic.

FIG. 4 illustrates a chart 60 showing pressure 62 in the transport line as a function of time, and showing double-dump airlock sequencing logic. The double-dump logic is a middle ground between the single and multi-dump methods. The logic is like that of the multi-dump logic, except that that it is simplified by simultaneously emptying only two airlocks 36. Like multi-dump, the open times of the outlet valve 42 may be adjusted during the initial startup of the system to ensure that sufficient open time is allowed to completely fill and empty each airlock 36. Table 2 below shows the sequence of pressure band assignments. The first and second bands, but not the third and fourth bands, are included in the double-dump logic, as shown in FIG. 4.

TABLE 2

|  | Count 1 | Count 2 | Count 3 | Count 4 | Count 5 | ... | ... | Count 20 |
| --- | --- | --- | --- | --- | --- | --- | --- | --- |
| Band 1 | Airlock 1 | Airlock 3 | Airlock 2 | Airlock 4 | Airlock 1 | ... | ... | Airlock 4 |
| Band 2 | Airlock 3 | Airlock 1 | Airlock 4 | Airlock 2 | Airlock 3 | ... | ... | Airlock 2 |

Start-up operation is described as follows. The first and third airlocks 36 (FIG. 1) start and complete the filling cycle. The first airlock 36 nearest the storage silo 26 is assigned to the first pressure band, and opens its outlet valve 42. Ash flows in the transport pipe 20 from the first hopper 34, causing the pressure to rise. The sensor 46 continually measures the pressure in the transport pipe 16. If the pressure does not rise above the first upper pressure threshold (e.g. 14 psi) after a first predefined period of time (e.g. about 5 seconds) elapses, then the third airlock 36, which is assigned to the second pressure band, is also opened and discharges ash into the transport pipe 20. Once the second upper pressure threshold is exceeded, the third airlock 36, if open, is closed.

The second and fourth airlocks 36 then start and complete the filling cycle when the time that the third airlock 36 has been emptying becomes equivalent to the common fill time of all the airlocks 36. Since the third airlock 36 may continue to empty for more time, an overlap in the filling and dumping of the multiple airlocks 36 is created, thus preventing a gap in ash transport.

Steady-state operation is described as follows. If the pressure exceeds the first upper threshold, then the first airlock 36 is closed, thus no airlocks 36 will be open. But if the pressure falls below the first lower threshold, indicating that the transport pipe 20 can take more ash, then the first airlock 36 is opened again.

Then, if the pressure falls below the second lower threshold, indicating that the transport pipe 20 can take more ash (e.g. because the first airlock 36 is emptying), then the third airlock 36 is opened again, thus the first and third airlocks 36 are both simultaneously open. If the pressure exceeds the second upper threshold (e.g. because there is too much ash is being dumped in the transport line 20), then the third airlock 36 is closed, thus only the first airlock 36 is open.

During the operation described above, the airlocks 36 (and thus hoppers 34) may switch assigned pressure bands. The switching may be automated. Once the airlock count of the first airlock 36 times out (since it has been open the longest), the assignments are switched from Count 1 to Count 2, as shown in Table 2. After the first airlock count has expired, meaning that the airlock 36 is empty, the airlock stops discharging and waits to start filling again (the filling process starts for the first and third airlocks after the fourth airlock valve 42 has timed down to the common fill time of all the airlocks). When the airlock count of the third airlock 36 times out (since it has now been open the longest), the assignments are switched from Count 2 to Count 3, as shown in Table 2. In Count 3, the second and fourth airlocks 36 are respectively assigned to the first and second bands, and begin the dumping cycle. The process continues as an airlock count of each subsequent airlock 36 times out. As shown, the assignments repeat after every fourth assignment (e.g. the Count 1 assignments are identical to the Count 5 assignments). The assignments shifts typically occur at about 15 seconds to about 20 second intervals, which may be predefined e.g. determined during system startup.

Figure 5:
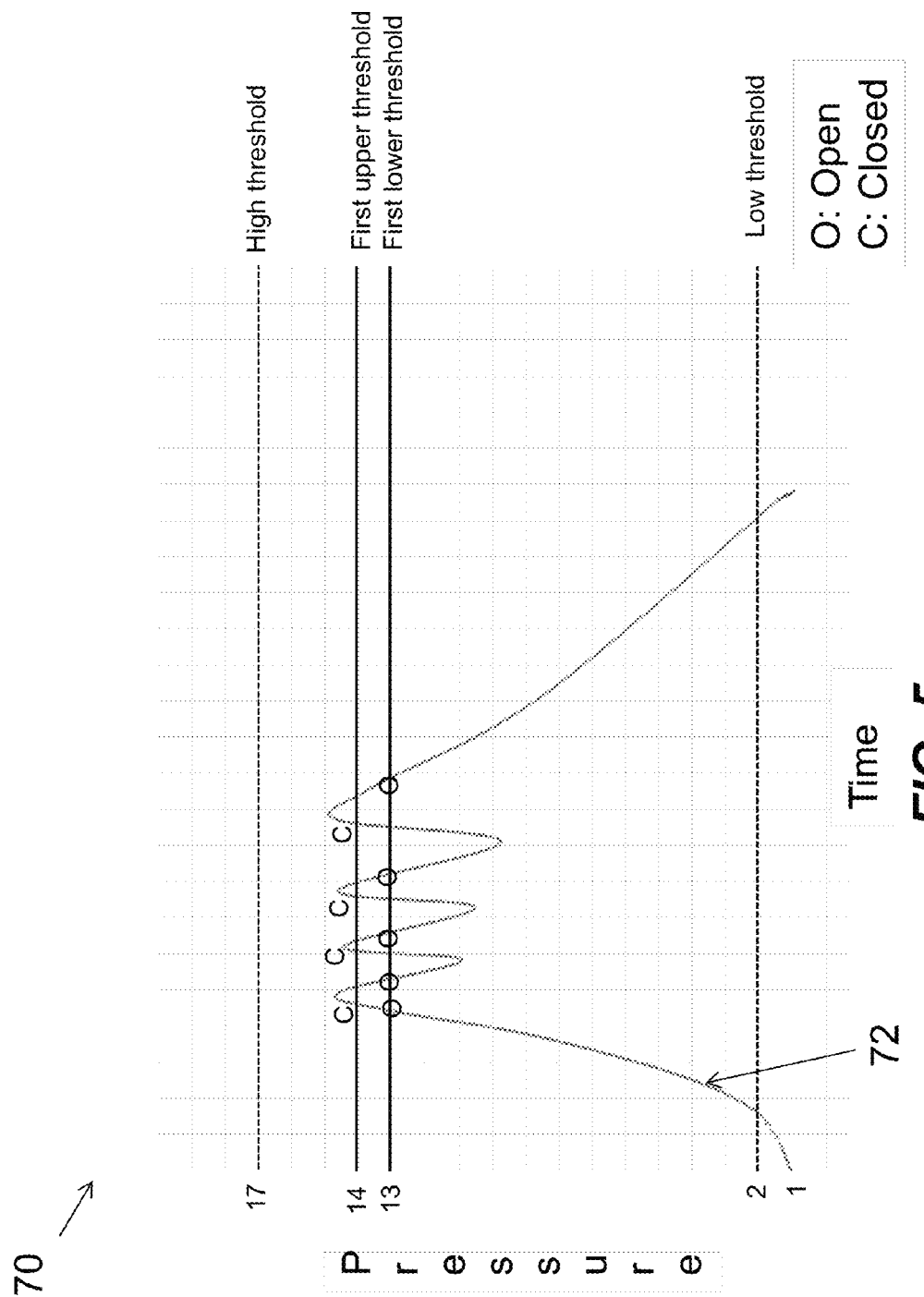
FIG. 5 is a chart showing pressure in the transport line as a function of time, and showing a single-dump airlock sequencing logic.

FIG. 5 illustrates a chart 70 showing pressure 72 in the transport line as a function of time, and showing single-dump airlock sequencing logic. The single-dump logic is even more simplified than the double-dump logic. The single dump logic empties only a single airlock 36 at a time. The opening and closing of the outlet valve 42 is dictated by pressure. The time allocated to each airlock is set by the airlock count duration, which, as in multi-dump and double-dump, is primarily dependent on fill and empty time. The empty time is adjusted during initial startup of the system to ensure that sufficient open time is allowed to completely empty the airlock 36. The row counts are also adjusted at this time.

Operation is described as follows. The first airlock 36 starts and completes the filling cycle. The first airlock 36 nearest the storage silo 26 is assigned to the first (only) pressure band, and opens its outlet valve 42. Ash flows in the transport pipe 20 from the first hopper 34, causing the pressure to rise. The sensor 46 continually measures the pressure in the transport pipe 16.

The second airlock 36 then starts and completes the filling cycle when the time that the first airlock 36 has been emptying becomes equivalent to the common fill time of all the airlocks 36. Since the first airlock 36 may continue to empty for more time, an overlap in the filling and dumping of the multiple airlocks 36 is created, thus preventing a gap in ash transport.

Steady-state operation is described as follows. If the pressure exceeds the first upper threshold, then the first airlock 36 is closed. But if the pressure falls below the first lower threshold, indicating that the transport pipe 20 can take more ash, then the first airlock 36 is opened again.

During the operation described above, the first airlock 36 times out, and the second airlock 36 starts discharging. The third airlock 36 then waits until the second airlock 36 times down to the common top gate time to start filling. The process continues cycling through the first, second, third, fourth airlocks 36, then back to the first airlock 36, and so on, until the desired row counts (e.g. 20 counts) are completed.

Figure 6:
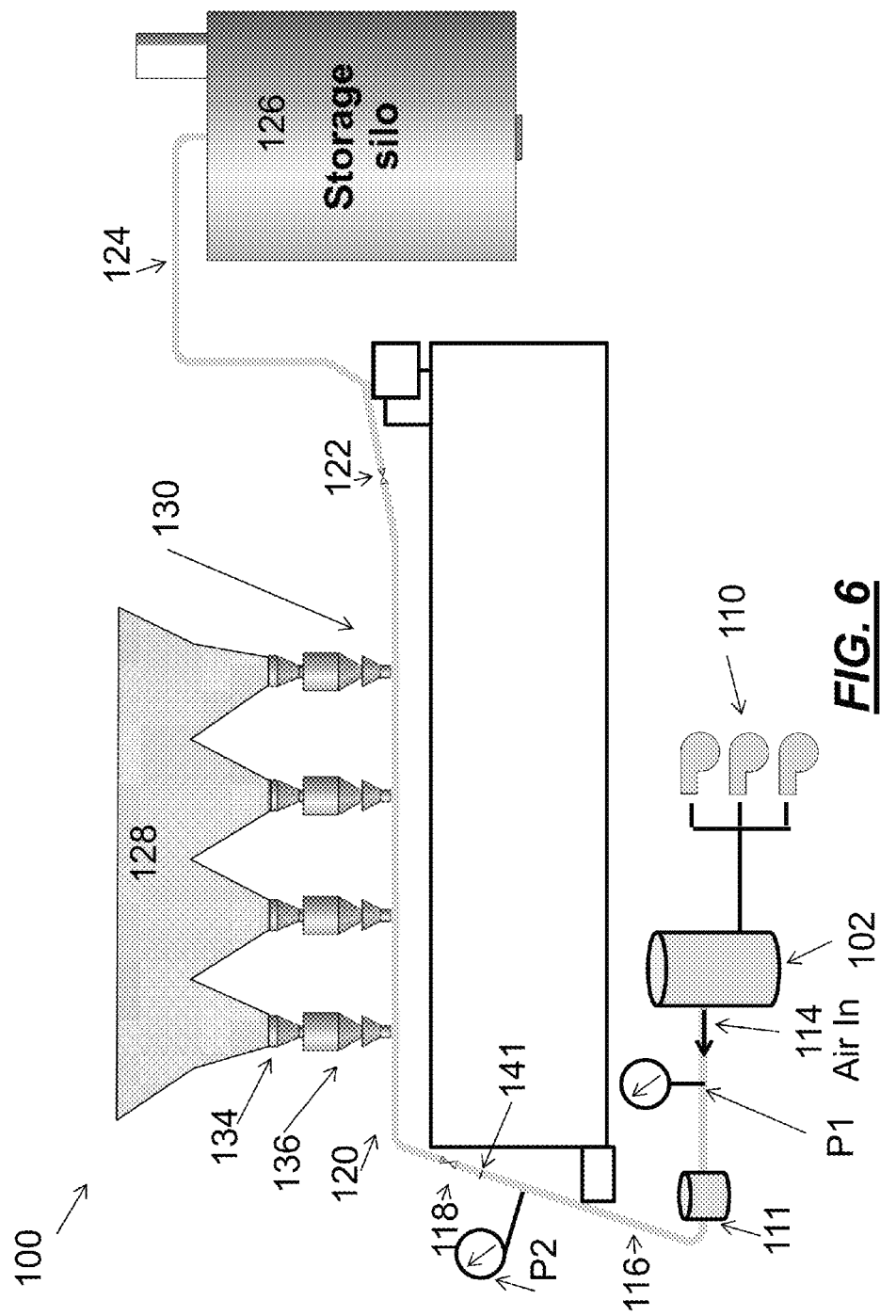
FIG. 6 is a schematic view of ash pressure transport system using a compressor as an air producer.

FIG. 6 illustrates an ash transport system 100 implemented as a compressor blower system using compressors 110 rather than the pressure blower 12 to transport the ash. The ash transport system 100 can be used in multi-dump (FIG. 3), double-dump (FIG. 4), or single-dump (FIG. 5) modes. This ash transport system 100 may have the similar features as the ash transport system 10 of FIG. 1, for example transport pipes 116, 120, and 124, valves 118 and 122, a storage silo 126, a collector 128, a first row 130 and a second row (not shown) of hoppers 134, and airlocks 136.

Not shown for the sake of simplified illustration is a separate airlock line which branches from transport pipe 116 and supplies air at a pressure slightly greater than transport line 120 to provide a positive pressure to drive the flow of ash from airlocks 136 into transport line 120. A positive pressure can be provided to the use of a restrictor such as an orifice plate 141 or other pressure reduction element in transport pipe 116. By tapping into transport pipe 116 before the restrictor a higher pressure source is applied to the upper portion of each airlock 136 for facilitating draining as mentioned previously. Thus, the pressure applied to the airlock 136 is higher than pressure in transport line 120 after the orifice plate 141.

The pressure blower 12 of FIG. 1 provides constant volumetric flow, typically operates at about 15 psi, and has a maximum desired operating pressure of about 18 psi. If an airlock 36 dumps too much ash, a large slug can develop, causing the pressure blower 12 to shut down. However, for some applications it is desirable to provide more material in the transport line.

Thus, a set of compressors 110 (e.g. 3 or 4) can be used to supply air to a receiver tank 102, producing pressures of 100 psi or up to about 100 psi, for example. Two pressure transmitters can be utilized—one (P2) located just upstream of the airlock tank 136 and the other located just downstream of the pressure regulator 111 (P1). Normal supply pressure (P1) may be about 6 bar (85 psi), and normal operating pressure (P2) may be about 2 bar (30 psi).

However, unlike some pressure blowers, compressors may not operate with constant volumetric flow. In order to keep the receiver tank within a certain band, air is drawn from the compressors constantly, thus, the supply pressure oscillates. Under normal circumstances, the supply pressure will dip slowly when flow is required in the system. This dip may not be high enough to cause any problems with transportation of ash to the silo. However, if the volume of air is reduced due to the dip in pressure the system may have a problem with transporting ash to the silo. In this case, the predefined pressure bands describe above for the pressure blower system may not be used, because fluctuating pressure may not be indicative of how much ash is in the transport line.

Figure 7:
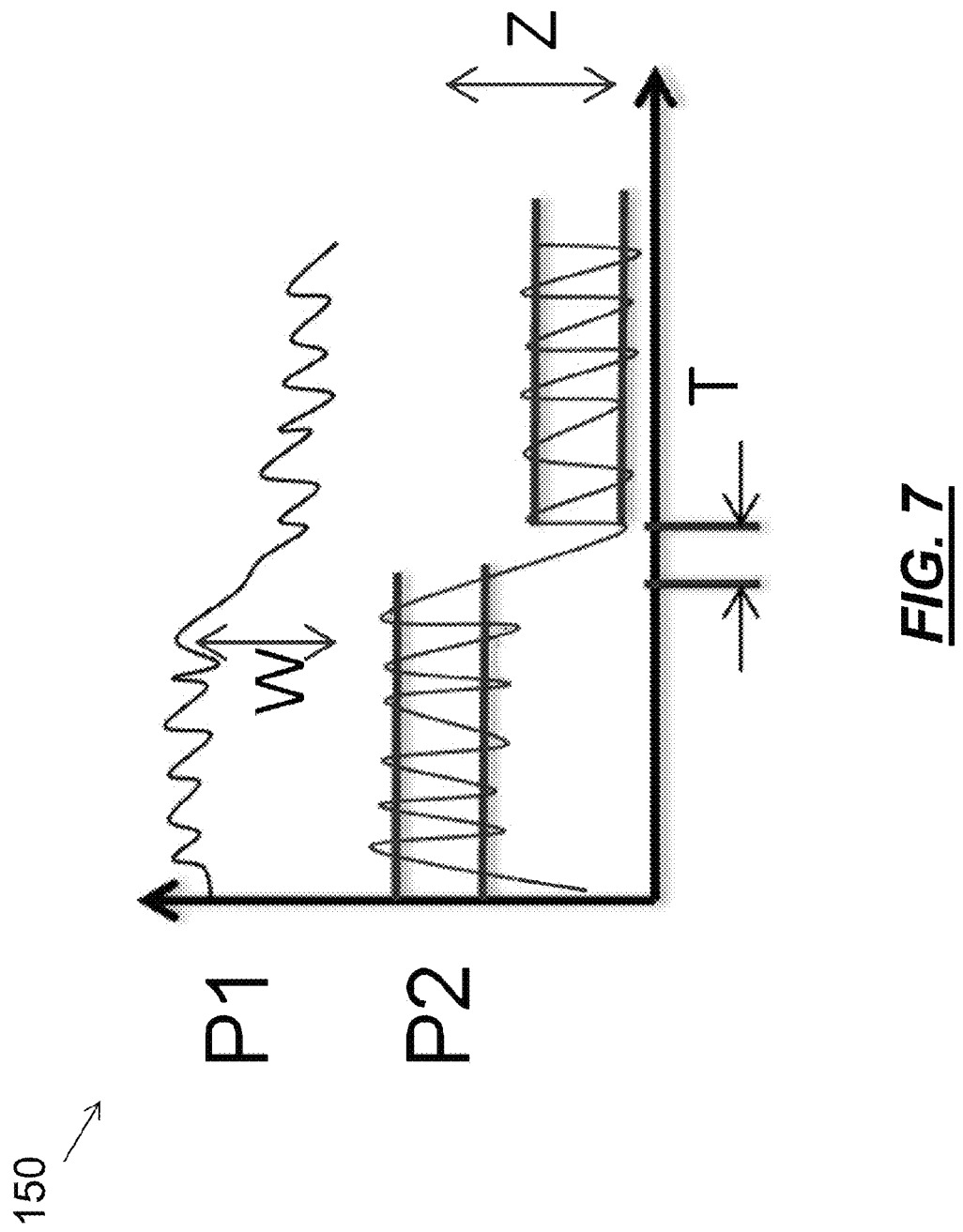
FIG. 7 is a chart showing supply pressure and operating pressure in the ash pressure transport system of FIG. 6 using a compressor as an air producer.

Thus, in the ash transport system 100 having compressors 110, each of the pressure bands and pressure thresholds may vary as a function of current air provided to the transport line by the compressor system (e.g. floating thresholds). For example, the thresholds may be dynamically increased as more air is provided in the transport line, and the thresholds may be dynamically decreased as less air is provided in the transport line. As shown in the chart 150 in FIG. 7, if the normal supply pressure (P1) is set for 6 bar (85 psi) then the allowable dip in the pressure thresholds before any changes should be "W" amount of pressure. This dip will have a time delay before any changes to the threshold settings are changed up to "T" seconds before proceeding to the next step. If the normal supply pressure (P1) has dipped lower than "W" amount for more than the allowable time ("T") then all the threshold settings will change by a "Z" amount. (This is a subtraction of 6 bar (85 psi) minus P1). This will keep changing each second when the normal supply pressure (P1) is dropping. These new pressure settings will continually reduce until the normal pressure falls below the minimum normal pressure setpoint of "AA". At this point all the bottom gates remain closed until the normal supply pressure (P1) returns to normal and remains there for a "BB" amount of time. If the normal supply pressure (P1) has not reduced to below the minimum pressure and has started to rise back to the normal supply pressure (P1) the new threshold settings will increase to the original settings after a time period of "BB" has passed.

Figure 8:
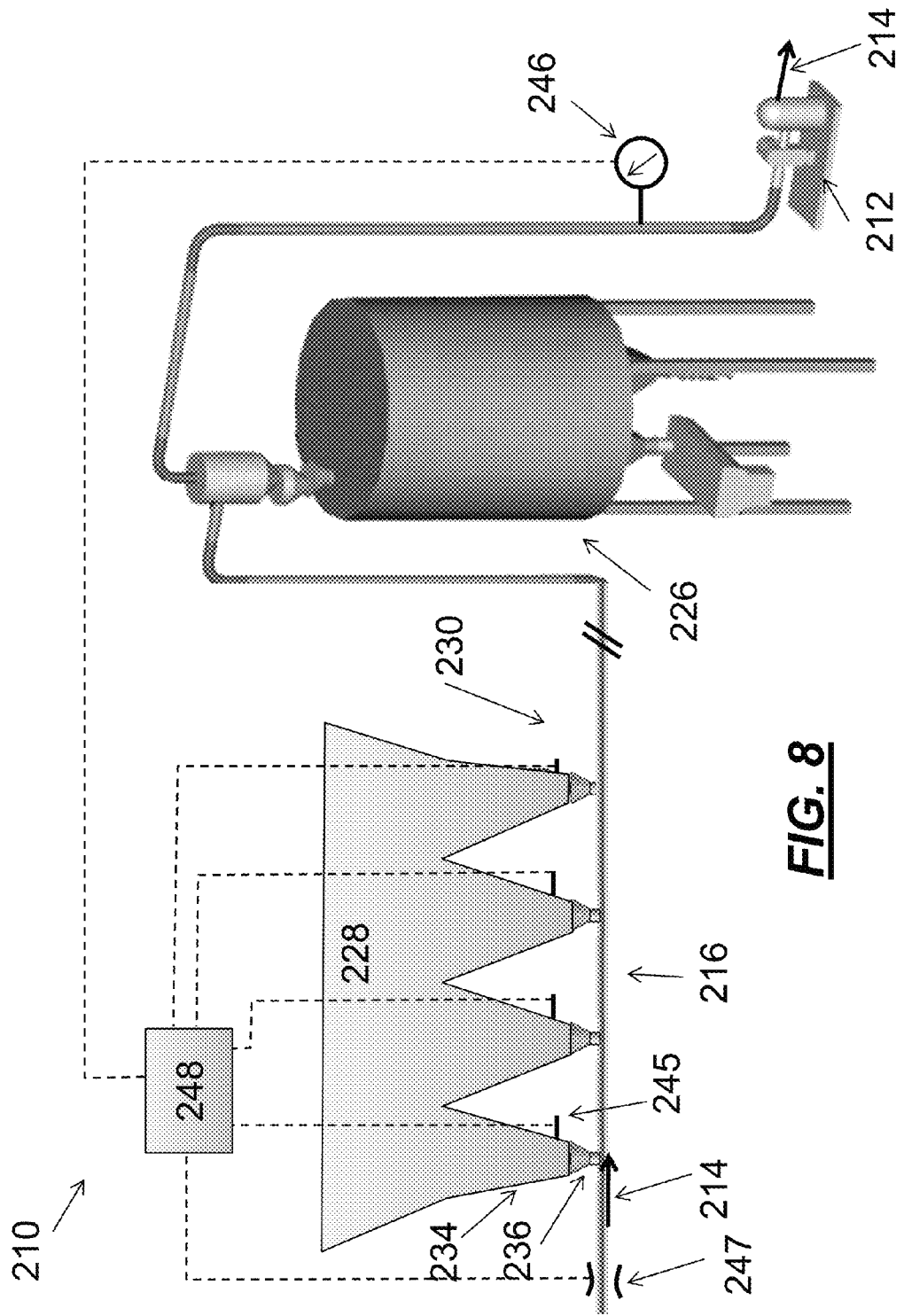
FIG. 8 is a schematic view of an ash transport system implemented as a vacuum pump system.

FIG. 8 illustrates an ash transport system 210 implemented as a vacuum pump system. The system has the same features as the system 10 of FIG. 1, except for the differences noted herein. A vacuum pump 212 pumps air 214 through a transport pipe 216 and toward a silo 226 and the vacuum pump 212. A collector 228 drops ash via gravity into a row 230 of hoppers 234 underneath the collector 228. Underneath each of the hoppers 234 are respective hopper valves 236. The transport pipe 216 may branch and lead to multiple rows of hoppers 234, as in the system 10 of FIG. 1, but for simplicity multiple rows are omitted from FIG. 8. A process feedback signal (e.g. pressure feedback signal) is provided based on a measurement taken by a sensor 246 (e.g. pressure sensor) downstream of the hoppers 234 and near the vacuum pump 212. Additionally, an air (flow) meter 247 (if used) is placed at the air intake point for measuring whether air is or is not being sucked in at the intake. Further, each hopper 234 may include level probes 245 for measuring ash as it falls through each hopper 234. Note that in vacuum systems, the pressure is typically measured in inches of mercury. Additionally, a programmable logic controller (PLC) 248 receives measurements from the sensor 246, air meter 247, and the level probes 245.

Figure 9:
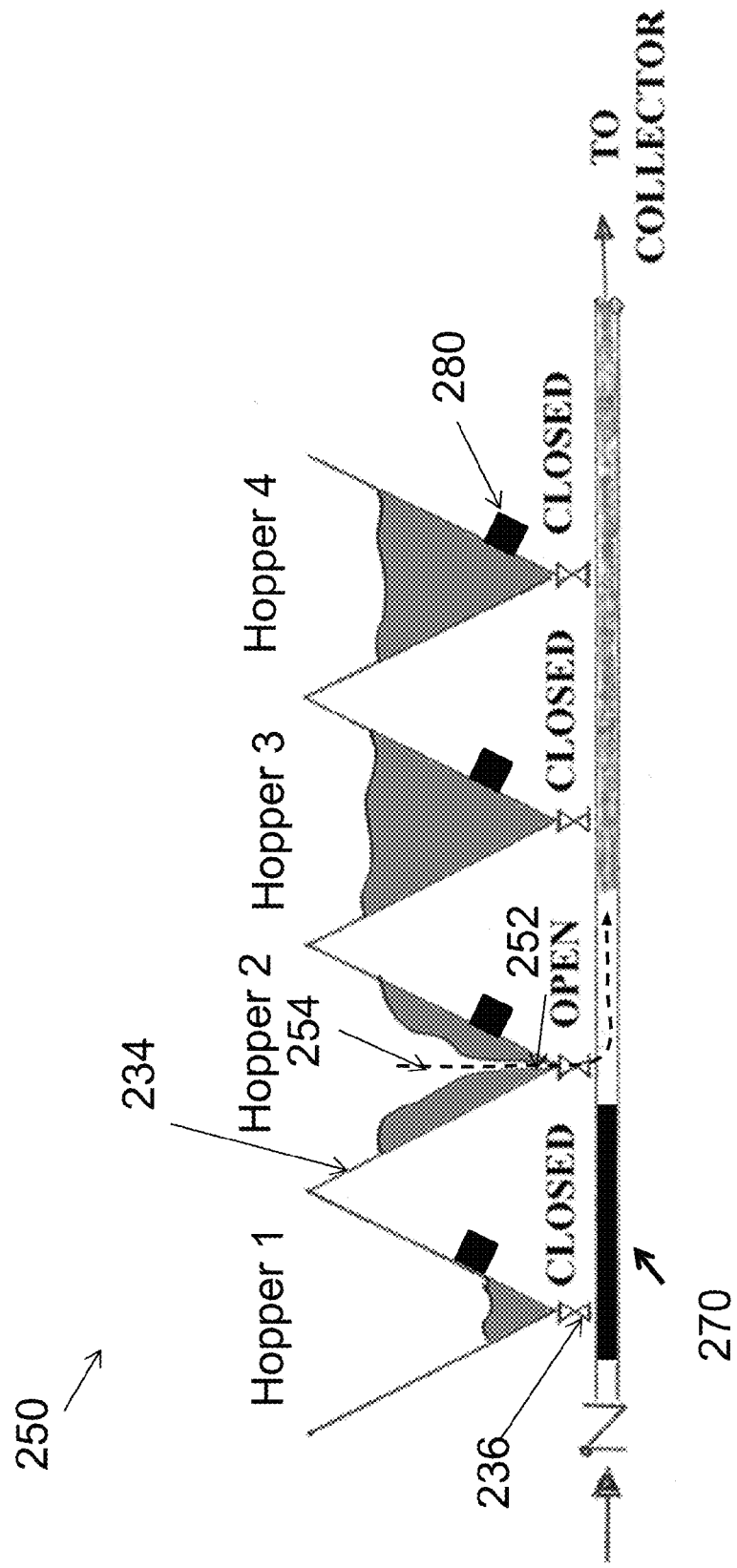
FIG. 9 is a schematic view of a hopper in which an unwanted bypass has developed.

FIG. 9 illustrates vacuum system 250 having a hopper 234 in which an unwanted bypass 252 (e.g. a rat hole in hopper number 2) has developed. A problem arises in vacuum pump systems when dumping ash from multiple hopper valves 236 simultaneously. If the vacuum pump 212 is discharging ash from the first and second hopper valves 236 simultaneously, then the pressure signal, unlike in the pressure blower system, may not indicate whether the first or second hopper valves 236 are empty. For example, as shown in FIG. 9, the second hopper valve 236 may empty, and flue gas 254 may be drawn in by the vacuum pump 212 to the silo 226. Thus, the ash plug 270 in the part of the pipe 216 under the first airlock 236 will not get sucked in, and instead clog the pipe 216. Thus, a bypass 252 is created between the second airlock 236 and the vacuum pump 212.

This problem can be solved in a number of ways, so that a multi-dump system can be implemented in a vacuum pump system 210. In addition, the advantages shared with a multi-dump system in a pressure blower system, a multi-dump system is helpful in a vacuum pump system because the addition of modern environmental equipment that is used to treat flue gas. This equipment uses lime mixed with the ash stream to strip sulfur from the gas stream. The process efficiency relies on the ash particles having large surface areas. Thus, ash is typically collected in a bag house 228 and recycled at relatively high flow rate back to a dry scrubber silo. The ash transport rate to the scrubber often exceeds the discharge rate to a waste ash silo. Thus, multiple discharge increases the discharge rate to match.

One solution is to use the level probes 245, which indicate whether the ash content in the hopper 234 has fallen below a predefined level. If it has, then a vibrator 280 turns on, causing any material built up on the hopper 234 walls to fall to the bottom of the hopper 234. The vibrator is shut off when the hopper valve 236 is closed. When the ash in the hopper is disturbed, the remaining fly ash will fall to the bottom of the hopper 234, and if the level rises above the upper level probe 245 the vibrator 280 is shut off. When the material falls below the upper level probe 245 again, the vibrator 280 turns on again. This continues until the material falls below the lower level probe 245. If vibrators are not equipped, then the upper level probe can be used as a means of indicating that the hopper is nearing empty (or is not required). Alternatively or additionally, after fully discharging a row of hoppers 234, each hopper 234 can be opened individually to check, using pressure measurements, whether there is any ash remaining.

Figure 10:
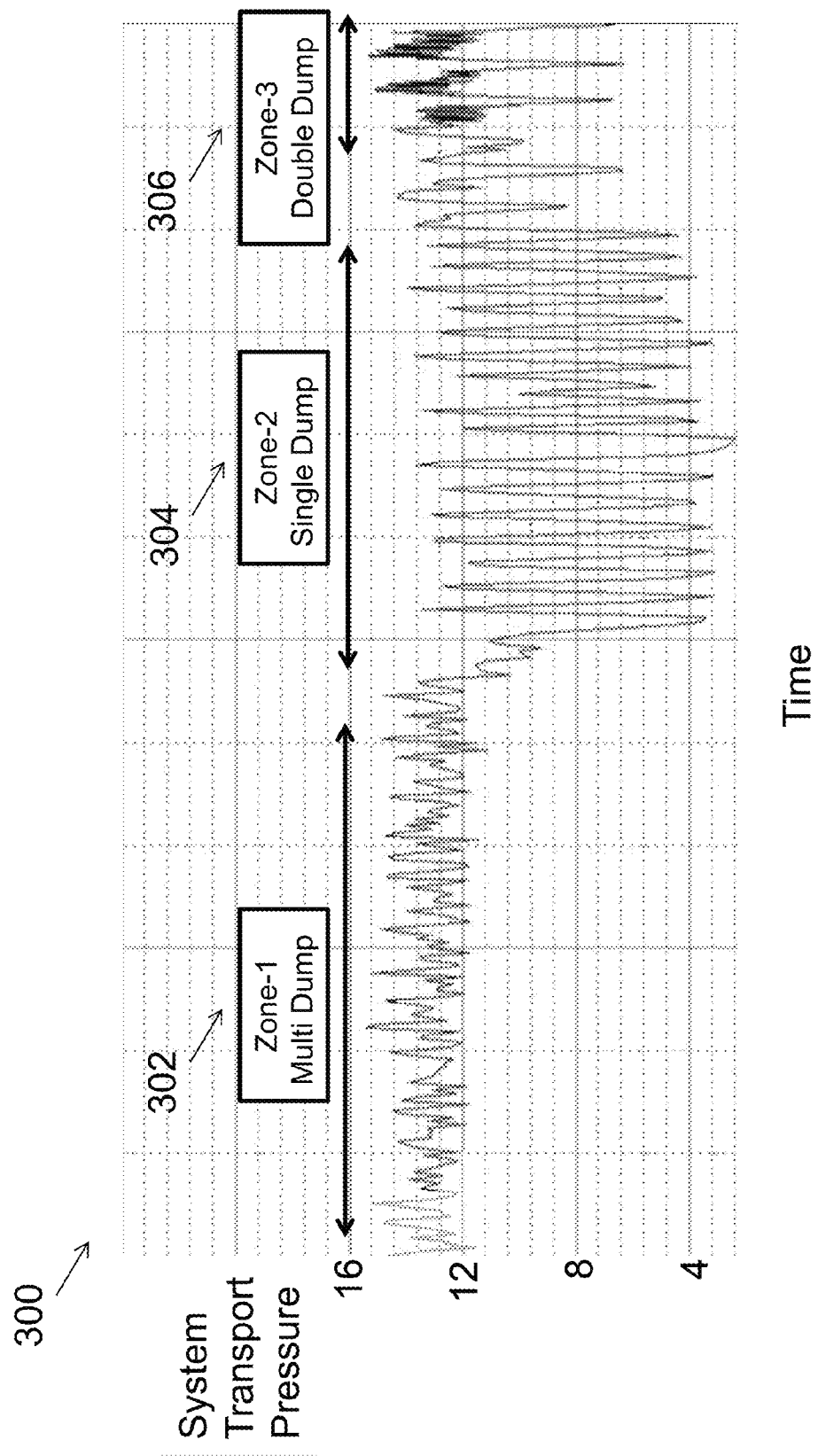
FIG. 10 is a chart comparing pressure as a function of time for multi-dump, double dump, and single dump systems.

FIG. 10 illustrates a chart 300 comparing pressure as a function of time for multi-dump, double dump, and single dump pressure systems logic, as measured by experiment in the pressure blower system. However, these results are generalizable to other types of systems such as compressor and vacuum systems. As shown in zone 1 (302), the multi-dump logic reduces pressures spikes, and maintains a generally constant pressure over time. By contrast, as shown in zone 2 (304), pressure varies widely in single-dump, causing the ash to speed up (at low pressure) and slow down (at high pressure). The faster moving material at low pressure erodes the transport pipe. The slow moving material during a pressure overshoot may cause material to drop out of suspension and plug the line or causes a pressure spike, thereby activating the safety relief valve. Thus, a more stable pressure is desired. As shown in zone 3 (306), the double-dump causes larger pressure spikes than the multi-dump, but smaller pressure spikes than the single-dump.

Advantageously, the multi-dump system keeps the transport line stably filled compared to single-dump, thus increasing system capacity by more than 20%. The double-dump also improves capacity relative to the single-dump. In single-dump, the operating pressure drops to 400% below nominal, because the airlock is empty of material. Although this drop can be fixed by reducing the outlet valve 42 open time, the optimal required outlet valve 42 open time changes rapidly throughout operation based on the ash level in the hopper 34, and based on the ash aerated condition. The double-dump, and especially the multi-dump system, eliminates the need to constantly change the outlet valve 42 open time (instead, time settings of the valves 38 and 42 can be initialized before operation), and also bridges gaps in dumping by different airlocks 36.

Additionally, the double-dump and multi-dump allow several airlocks 36 to empty at the same time, thus reducing ash consolidation time in the hoppers 34. Reduced consolidation time in the hoppers 34 reduces the ash cohesive strength. Further, operating with the convey line fully loaded keeps ash velocity low, which reduces pipe erosion, convey line size and energy consumed in transport can be reduced relative to conventional systems.

The controllers, control circuits, modules, servers, or engines described (e.g. the PLC 248) may be implemented in one or more computer systems or integrated controllers. One exemplary system is provided in FIG. 11. The computer system 1000 includes a processor 1010 for executing instructions such as those described in the methods discussed above. The instructions may be stored in a computer readable medium such as memory 1012 or storage devices 1014, for example a disk drive, CD, or DVD, or in some form of nonvolatile memory, internal or external to the processor, such as EPROM or flash. The computer may include a display controller 1016 responsive to instructions to generate a textual or graphical display on a display device 1018, for example a computer monitor. In addition, the processor 1010 may communicate with a network controller 1020 to communicate data or instructions to other systems, for example other general computer systems. The network controller 1020 may communicate over Ethernet or other known protocols to distribute processing or provide remote access to information over a variety of network topologies, including local area networks, wide area networks, the Internet, or other commonly used network topologies.

In other embodiments, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system or processor. Further, in an exemplary, non-limited embodiment, implementations can include distributed processing, component/object distributed processing, and parallel processing. Alternatively, virtual computer system processing can be constructed to implement one or more of the methods or functionality as described herein.

Further, the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of implementation of the principles of this invention. This description is not intended to limit the scope or application of this invention in that the invention is susceptible to modification, variation and change, without departing from the spirit of this invention, as defined in the following claims.

What is claimed is:

1. An ash transport system comprising a first airlock, a second airlock, a transport line, a first airlock valve between the first airlock and the transport line, a second airlock valve between the second airlock and the transport line, a pressure sensor for measuring pressure in the transport line, and a controller configured to control the ash transport system to:
    open the first airlock valve to transport ash from the first airlock to the transport line upon the pressure falling below a first pressure threshold prior to a predefined period of time elapsing;
    open the second airlock valve to transport ash from the second airlock to the transport line upon the pressure falling below a second pressure threshold prior to the predefined period of time elapsing, the second pressure threshold being lower than the first pressure threshold;
    and open the second airlock valve to transport, after the predefined period of time elapses, ash from the second airlock to the transport line upon the pressure falling below a third pressure threshold that is higher than the second pressure threshold.

2. The ash transport system of claim 1 wherein the third pressure threshold is equal to the first pressure threshold.

3. The ash transport system of claim 1 further comprising a first hopper and a second hopper respectively attached to the first airlock and the second airlock, a first hopper valve between the first hopper and the first airlock, and a second hopper valve between the second hopper and the second airlock, the controller being further configured to control the ash transport system to:
    open the first hopper valve to transport ash from the first hopper to the first airlock; and
    open the second hopper valve to transport ash from the second hopper to the second airlock.

4. The ash transport system of claim 1 wherein the predefined period of time is based on an amount of time required to empty the any one of the first airlock and the second airlock of the ash transport system.

5. The ash transport system of claim 1 further comprising a pressure blower attached to the transport line and configured to cause ash to be transported through the transport line.

6. The ash transport system of claim 1 wherein the first pressure threshold, the second pressure threshold, and the third pressure threshold are predefined.

7. The ash transport system of claim 1 further comprising a compressor attached to the transport line and configured to cause ash to be transported through the transport line.

8. The ash transport system of claim 7 wherein the first, pressure threshold, the second pressure threshold, and the third pressure threshold vary based on an amount of air transported to the transport line by the compressor.

9. The ash transport system of claim 1, the controller being further configured to control the ash transport system to open the second airlock valve while the first airlock valve remains open when, prior the predefined period of time elapsing, the pressure in the transport line falls below the first pressure threshold and below the second pressure threshold.

10. The ash transport system of claim 1, the controller being further configured to control the ash transport system to open the first airlock valve, after the predefined period of time elapses, to transport ash from the first airlock to the transport line when the pressure in the transport line falls below a fourth pressure threshold that is different from the first pressure threshold.

11. The ash transport system of claim 10 wherein the third pressure threshold is equal to the first pressure threshold, and wherein the fourth pressure threshold is equal to the second pressure threshold.

12. The ash transport system of claim 1, wherein the predefined period of time is a first predefined period of time, the controller being further configured to control the ash transport system to open the second airlock valve, after a second predefined period of time that begins elapsing after the first predefined period of time has elapsed, ash from the second airlock to the transport line when the pressure in the transport line falls below a fourth pressure threshold that is different from the second and third pressure thresholds.

13. The ash transport system of claim 1, the controller being further configured to cause the ash transport system to close the second airlock valve to the transport line if the pressure in the transport line exceeds a fourth pressure threshold lower than the first pressure threshold and the second pressure threshold.

14. The ash transport system of claim 13, the controller being further configured to cause the ash transport system to close the first airlock valve when the pressure in the transport line exceeds a fifth pressure threshold higher than the fourth pressure threshold, but lower than the first pressure threshold.

15. The ash transport system of claim 1 further comprising a third airlock and a third airlock valve between the third airlock and the transport line, the controller being further configured to cause the ash transport system to open the third airlock valve to transport, prior to the predefined period of time, ash from the third airlock to the transport line when the pressure in the transport line falls below a fourth pressure threshold, wherein the first pressure threshold, the second pressure threshold, and the fourth pressure threshold are different from each other.

16. The ash transport system of claim 15, the controller being further configured to control the ash transport system to open the third airlock valve, after the predefined period of time elapses, to transport ash from the third airlock to the transport line if the pressure in the transport line falls below the second pressure threshold, wherein the third pressure threshold is equal to the first pressure threshold.

17. The ash transport system of claim 15 further comprising a fourth airlock and a fourth airlock valve between the fourth airlock and the transport line, the controller being further configured to control the ash transport system to open the fourth airlock valve, prior to the predefined period of time, to transport ash from the fourth airlock to the transport line when pressure in the transport line falls below a fifth pressure threshold that is different from the first pressure threshold, the second pressure threshold, and the fourth pressure threshold.

18. The ash transport system of claim 15, the controller being further configured to control the ash transport system to fill the first airlock while emptying the third airlock.

19. A method of transporting ash, the method comprising:
measuring pressure in a transport line;
opening a first airlock valve to transport ash from a first airlock to the transport line when the pressure in the transport line crosses a first pressure threshold;
opening a second airlock valve to transport ash from a second airlock to the transport line when the pressure in the transport line crosses a second pressure threshold lower than the first pressure threshold; and
opening the second airlock valve, after a predefined period of time elapses, to transport ash from the second airlock to the transport line when the pressure in the transport line crosses a third pressure threshold that is higher than the second pressure threshold.

20. The method of claim 19 wherein the third pressure threshold is equal to the first pressure threshold.

21. The method of claim 19 further comprising:
transporting ash from a first hopper to the first airlock; and
transporting ash from a second hopper to the second airlock.

22. The method of claim 19 further comprising transporting ash through the transport line using a pressure blower.

23. The method of claim 19 further comprising transporting ash through the transport line using a compressor.

24. The method of claim 19 further comprising transporting ash simultaneously from the first and second airlocks to the transport line.

25. The method of claim 19 further comprising opening the first airlock valve, after the predefined period of time elapses, to transport ash from the first airlock to the transport line if the pressure in the transport line crosses a fourth pressure threshold that is different from the first pressure threshold.

26. The method of claim 19 further comprising closing the second airlock valve to stop transporting ash from the second airlock to the transport line when the pressure in the transport line crosses a fourth pressure threshold.

27. The method of claim 19 further comprising opening a third airlock valve to transport ash from a third airlock to the transport line when the pressure in the transport line crosses a fourth pressure threshold, wherein the first pressure threshold, the second pressure threshold, and the fourth pressure threshold are different from each other.

28. The method of claim 27 further comprising opening the third airlock valve, after the predefined period of time elapses, to transport ash from the third airlock to the transport line when the pressure in the transport line falls below the second pressure threshold, wherein the third pressure threshold is equal to the first pressure threshold.

29. An ash transport system comprising:
a transport line;
a pressure sensor for measuring pressure in the transport line;
first and second airlocks;
a first airlock valve between the first airlock and the transport line, a second airlock valve between the second airlock and the transport line,
first and second hoppers respectively attached to the first and second airlocks, and
a controller configured to control the ash transport system to:
open the first airlock valve to transport ash from the first airlock to the transport line upon the pressure falling below a first pressure threshold prior to a predefined period of time elapsing;
open the second airlock valve to transport ash from the second airlock to the transport line upon the pressure falling below a second pressure threshold prior to the predefined period of time elapsing, the second pressure threshold being lower than the first pressure threshold;

open the first airlock valve to transport, after the predefined period of time elapses, ash from the first airlock to the transport line upon the pressure falling below a third pressure threshold that is lower than the second pressure threshold; and open the second airlock valve to transport, after the predefined period of time elapses, ash from the second airlock to the transport line upon the pressure falling below the first pressure threshold.

30. An ash transport system comprising a first hopper with a first hopper valve and containing a first ash mass, a second hopper with a second hopper valve and containing a second ash mass, a transport line, a vacuum pump attached to the transport line and configured to cause the first and second ash masses to be transported through the transport line, a pressure sensor for measuring pressure in the transport line, and a controller configured to control the ash transport system to:

open the first hopper valve to transport the first ash mass from the first hopper to the transport line upon the pressure falling below a first pressure threshold prior to a predefined period of time elapsing;

open the second hopper valve to transport the second ash mass from the second hopper to the transport line upon the pressure falling below a second pressure threshold prior to the predefined period of time elapsing, the second pressure threshold being lower than the first pressure threshold; and open the second hopper valve to transport, after the predefined period of time elapses, ash from the second hopper to the transport line upon the pressure falling below a third pressure threshold that is higher than the second pressure threshold.

31. The ash transport system of claim 30 wherein the third pressure threshold is equal to the first pressure threshold.

32. The ash transport system of claim 30, the controller being further configured to cause the ash transport system to:
transport the first ash mass from the first hopper to the first hopper valve; and
transport the second ash mass from the second hopper to the second hopper valve.

33. The ash transport system of claim 32 further comprising:
a level probe attached to the first hopper and configured to detect whether the first hopper is filled to less than a predefined level; and
a vibrator attached to the first hopper, the controller being configured to cause the vibrator to vibrate when the level probe detects that the first hopper is filled to less than a predefined level.

34. The ash transport system of claim 30 wherein the predefined period of time is based on an amount of time required to empty any one hopper in the ash transport system.

35. The ash transport system of claim 30, the controller being further configured to control the ash transport system to transport ash simultaneously from the first and second hopper valves to the transport line if, prior the predefined period of time elapsing, the pressure in the transport line falls below the first pressure threshold and below the second pressure threshold.

36. The ash transport system of claim 30, the controller being further configured to control the ash transport system to open the first hopper valve to transport, after the predefined period of time, ash from the first hopper valve to the transport line when the pressure in the transport line falls below a fourth pressure threshold that is different from the first pressure threshold.

37. The ash transport system of claim 30 further comprising a third hopper valve and a fourth hopper valve, the controller being further configured to control the ash transport system to:
open the third hopper valve to transport ash from the third hopper valve to the transport line if pressure in the transport line falls below a fourth pressure threshold; and
open the fourth hopper valve to transport ash from the fourth hopper valve to the transport line if pressure in the transport line falls below a fifth pressure threshold,
wherein the first pressure threshold, the second pressure threshold, the fourth pressure threshold, and the fifth pressure threshold are different from each other.

* * * * *